(12) United States Patent
Nemiroff et al.

(10) Patent No.: US 10,862,680 B2
(45) Date of Patent: Dec. 8, 2020

(54) ENCODING PROCESS FOR MULTIPLE RSA AND ECC KEYS

(71) Applicant: Intel Corporation, Santa Clara, CA (US)

(72) Inventors: Daniel Nemiroff, El Dorado Hills, CA (US); Xiaoyu Ruan, Folsom, CA (US); William Stevens, Jr., Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 16/142,587

(22) Filed: Sep. 26, 2018

(65) Prior Publication Data

US 2019/0044716 A1    Feb. 7, 2019

(51) Int. Cl.
| | | |
|---|---|---|
| *H04L 9/00* | (2006.01) | |
| *H04L 9/08* | (2006.01) | |
| *H04L 9/30* | (2006.01) | |
| *H04L 9/14* | (2006.01) | |
| *H04L 9/32* | (2006.01) | |

(52) U.S. Cl.
CPC .......... *H04L 9/0869* (2013.01); *H04L 9/0894* (2013.01); *H04L 9/14* (2013.01); *H04L 9/302* (2013.01); *H04L 9/3066* (2013.01); *H04L 9/3242* (2013.01); *H04L 2209/12* (2013.01); *H04L 2209/34* (2013.01)

(58) Field of Classification Search
CPC .... H04L 9/0869; H04L 9/0861; H04L 9/3249
USPC ....... 380/44, 231, 233, 279; 713/2, 193, 194
See application file for complete search history.

(56) References Cited

U.S. PATENT DOCUMENTS

| | | | |
|---|---|---|---|
| 9,800,409 B2 | 10/2017 | Nemiroff | |
| 9,949,115 B2* | 4/2018 | Avanzi | ............ H04L 9/302 |
| 2010/0329455 A1* | 12/2010 | Nemiroff | ............ H04L 9/0869 380/46 |
| 2011/0010720 A1* | 1/2011 | Smith | ............ G06F 11/3688 718/102 |
| 2016/0261565 A1* | 9/2016 | Lorenz | ............ H04L 9/0866 |

(Continued)

OTHER PUBLICATIONS

"Guide to Elliptic Curve Cryptography"—Hankerson et al, Springer-Verlag New York, Inc., Apr. 2004 https://citeseerx.ist.psu.edu/viewdoc/download?doi=10.1.1.394.3037&rep=rep1&type=pdf (Year: 2004).*

*Primary Examiner* — Randy A Scott
(74) *Attorney, Agent, or Firm* — Schwabe, Williamson & Wyatt, P.C.

(57) ABSTRACT

In embodiments, an apparatus for microcontroller (µC) or system-on-chip (SoC) computing includes a set of fuses disposed in a µC or a SoC to store a seed value and M pairs of loop counter values (LCVs) with which to locally generate M private keys from the seed value on the microcontroller or SoC, where M is a positive integer, each private key to decrypt data encrypted with a pre-defined public key cryptosystem, wherein each private key includes two prime numbers p and q (p,q), the LCVs being a number of iterations of a key derivation function (KDF) needed to respectively obtain p and q from the seed value; and a key decoder, disposed in the (µC) or the SoC, and coupled to the set of fuses, to read the seed value and the M pairs of LCVs, and, for each of the M private keys to: respectively generate (p,q) from the seed value by respectively iterating the KDF by the LCVs for that key.

19 Claims, 10 Drawing Sheets

(56) References Cited

U.S. PATENT DOCUMENTS

2018/0183774 A1\* 6/2018 Campagna ............ H04L 9/3247
2019/0238342 A1\* 8/2019 Lian ........................ H04L 9/321

\* cited by examiner

US 10,862,680 B2

ENCODING PROCESS FOR MULTIPLE RSA AND ECC KEYS

FIELD

The present disclosure relates to the field of computer security, and in particular, to systems and methods for encoding multiple private keys (for a public key cryptosystem) on a computing device.

BACKGROUND

Devices with embedded systems that use Rivest-Shamir-Adelman (RSA) and/or Elliptic-Curve Cryptography (ECC) cryptosystems for secure applications often have one or more unique RSA/ECC private keys burned into security fuses on the device during manufacturing. In many cases, the device needs multiple RSA/ECC keys to be provisioned into fuses. However, fuses are expensive resources, and example private key lengths may be from 2048 through 4096 bits. Given that a fuse stores one bit of data, to store multiple private RSA/ECC keys may quickly become very costly.

DETAILED DESCRIPTION

Figure 1:
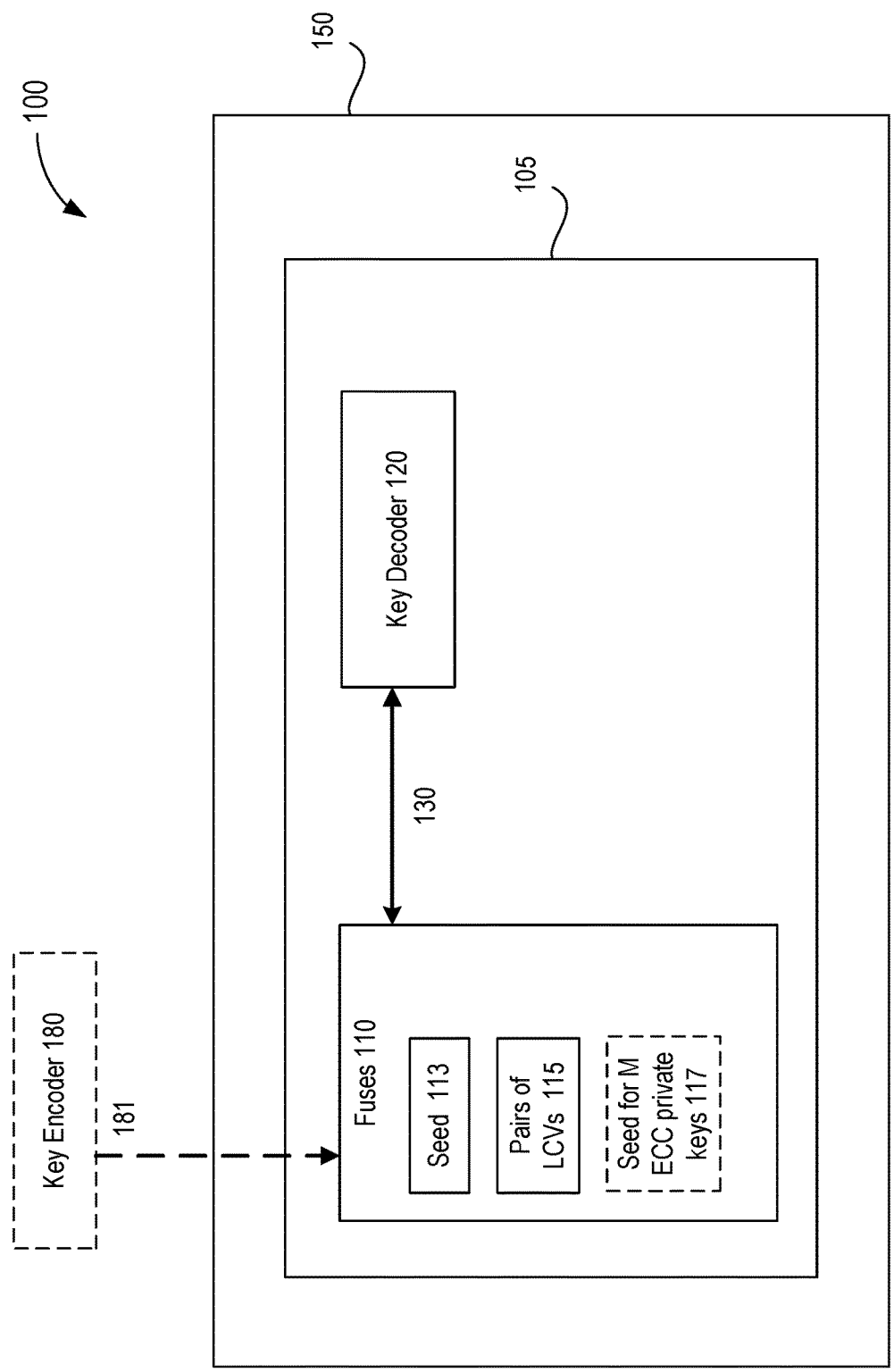
FIG. 1 illustrates an example microcontroller including a set of fuses, in accordance with various embodiments.

In embodiments, an apparatus for microcontroller (μC) or system-on-chip (SoC) computing includes a set of fuses disposed in a μC or a SoC to store a seed value and M pairs of loop counter values (LCVs) with which to locally generate M private keys from the seed value on the microcontroller or SoC, where M is a positive integer, each private key to decrypt data encrypted with a pre-defined public key cryptosystem, wherein each private key includes two prime numbers p and q (p,q), the LCVs being a number of iterations of a key derivation function (KDF) needed to respectively obtain p and q from the seed value; and a key decoder, disposed in the (μC) or the SoC, and coupled to the set of fuses, to read the seed value and the M pairs of LCVs, and, for each of the M private keys to: respectively generate (p,q) from the seed value by respectively iterating the KDF by the LCVs for that key.

In embodiments, one or more non-transitory computer-readable storage media includes a set of instructions, which, when executed on a processor coupled to a microcontroller (μC) or system-on-chip (SoC), cause the processor to compress multiple cryptographic private keys, including to: generate, randomly, a seed value from which to generate M private keys, where M is a positive integer, each private key to decrypt data encrypted with a pre-defined public key cryptosystem, wherein each private key includes two prime numbers p and q. The instructions, when executed, further cause the processor to, for each private key, respectively generate a pair of loop counter values (LCVs), the LCVs being a number of iterations of a key derivation function (KDF) needed to respectively obtain p and q from the seed value, and to store the seed value and the LCV pairs in a nonvolatile memory of the μC or SoC.

In embodiments, a method of μC or SoC computing includes: obtaining, locally, from a nonvolatile memory of a microcontroller (μC) or system-on-chip (SoC), a randomly generated seed value from which to derive M private Elliptic-Curve Cryptography (ECC) keys; generating, locally, within the μC or the SoC, a salt value (salt1 through saltM) for each of the M private ECC keys, where M is an integer; and respectively applying, locally, within the μC or the SoC, a key derivation function (KDF) to the seed and each of salt1 through saltM, to obtain the M ECC private keys.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, including in the claims, the term "chip" may refer to a physical integrated circuit (IC) on a computer. A chip in the context of this document may thus refer to an execution unit that can be single-core or multi-core technology.

As used herein, including in the claims, the term "fuse" refers to one time programmable memory elements in chips or dies. They may be utilized as permanent on chip memory storage, and may be provided in silicon chips, for example. Fuses may be made of polycrystalline silicon, which are constructed from layers of polycrystalline silicon and metal silicides.

As used herein, including in the claims, the term "processor" may refer to a logical execution unit on a physical chip. A multi-core chip may have several cores. As used herein, the term "core" may refer to a logical execution unit containing an L1 (lowest level) cache and functional units. Cores are understood as being able to independently execute programs or threads.

In embodiments, methods and apparatuses are presented for provisioning multiple RSA and ECC private keys in fuses, without significantly increasing the number of required fuses. In alternate embodiments, the same private keys may be provisioned in other secure nonvolatile memory.

Previous solutions to the problem of provisioning multiple RSA/ECC keys in fuses have simply been to proportionally increase the number of fuses used, depending on the number of keys. For example, if n fuses are required to store one key, then 32 keys use 32*n fuses. N, for example, may be 2048, 3072, or 4096 bits long. This solution is not scalable, in that it requires a large number of fuses to store a large number of private keys, where the number of fuses required is directly proportional to the number of keys needed or desired. Such a solution poses difficulty for resource-constrained environments, such as embedded systems. On the other hand, if a device is provisioned with a fewer-than-required number of keys during manufacturing due to fuse space limitation, then, in the field, when more keys are needed, the device must connect to a backend server to retrieve more keys. This requirement not only requires software stack and network connectivity, it also requires setup and maintenance of a backend server, which also creates a significant cost to the vendor or purveyor of the device.

Thus, in embodiments, encoding methods may be used to generate, and then compress, multiple RSA and ECC private keys into a number of bits considerably smaller than the total number of bits of the multiple keys. In embodiments, for RSA private keys, after the private keys are generated by a key encoder, they are encoded, by the key encoder, onto a microcontroller (μC) or system-on-chip (SoC) by storing only a seed value and a set of additional numbers that, taken together, may be used to regenerate the multiple private keys from the seed value. In these embodiments, the seed and some of the additional numbers needed to regenerate the keys are stored on the device in fuses, or other secure nonvolatile memory. Thus, for RSA, exemplary methods use a set of entropy/seed fuses and only a small number of additional fuses (which store the additional numbers) to reconstitute each additional RSA private key. For ECC, exemplary methods use a seed to derive virtually any number of ECC private keys. In embodiments, the seed for both RSA and ECC may be the same seed, in which case no additional storage is required to also encode ECC keys on a device that encodes multiple private RSA keys. Thus, in accordance with various embodiments, fuse usage for storing RSA and ECC private keys is significantly reduced, thus lowering die size and silicon cost.

In many scenarios, computing devices need more than one RSA and/or ECC key. For example, to support multiple applications on a given system, a dedicated key should be used for each application as a matter of isolation. The converse of isolation, where multiple applications share the same key, is understood to be poor security practice. This is because vulnerability in one application could compromise other applications that use the same key. In addition, a device may need multiple RSA and/or ECC keys if a vulnerability is found in a device's firmware that may result in compromise of the keys, then the firmware must be patched, and new keys provisioned to replace the old keys. Once this occurs, the hardware bootloader Read-Only Memory (ROM) needs to ensure that the vulnerable/old firmware cannot access the new keys.

In what follows, processes in accordance with various embodiments for encoding RSA keys on a device are first described, followed by a description of processes for encoding ECC keys on a device. Following that, processes in accordance with various embodiments for decoding (regenerating) each type of private key are described. As noted, in some embodiments the same seed may be stored and used to regenerate both RSA keys and ECC keys on an apparatus or device, such as, for example, a microcontroller (μC) or system-on-chip (SoC) device.

It is noted that a RSA private key consists of two large primes, denoted as p and q. Alternatively, an RSA private key may also be represented as integer d that is derived from the large primes (p, q) and a chosen public exponent e. In this schema, the size of integer d is equal to p and q combined. Thus, for a k-bit RSA private key, p and q are k/2 bits each. For example, 2048-bit RSA requires 2048-bit fuses to store its p and q, each of which is 1024 bits long. This is expensive for constrained environments.

FIG. 1 illustrates an example microcontroller in accordance with various embodiments. In some embodiments, microcontroller 105 may be provided on a SoC, such as SoC 150. The example microcontroller of FIG. 1 may have stored in it, in a set of fuses 110, a seed 113 and additional numbers with which to generate multiple RSA private keys. In embodiments, the additional numbers are pairs of LCVs 115, respectively corresponding to each of the two prime numbers (p, q) which comprise an RSA private key, as described above. Fuses 110 may be programmed at manufacture of microcontroller 105, for example, by a key encoder 180, as shown. In this way, the multiple private keys are already provisioned on the microcontroller, albeit in a compressed way. Continuing with reference to FIG. 1, microcontroller 105 includes a set of fuses 110 and a key decoder 120. Key decoder 120 reads the set of fuses 110 over link 130 to regenerate the multiple RSA keys.

As noted, in embodiments, seed 113 and LCV pairs 115 are originally generated by key encoder 180, which stores these values in fuses 110 at the time of manufacture, for example. Key encoder 180 (seed/LCV generator) is shown in dashed line in FIG. 1, as it is not part of or within microcontroller 105 or SoC 150, as shown, but rather runs on a manufacturer's or vendor's server that generates seed/LCV data and stores this data in fuses or NVM for various products at the time of manufacture. Thus, as described below in connection with FIG. 3, key encoder 180 generates private RSA keys using various key derivation functions (KDFs), and, once derived, communicates with microcontroller 105 over link 181 to store in fuses 110 a seed and one or more pairs of LCVs 115. LCVs 115 respectively correspond to each of the two prime numbers (p,q) which comprise an RSA private key, as described above. Each pair of LCVs gives the number of iteration loops of the KDF needed to respectively generate p and q (for one private key) from the seed. For example, for a 2048 bit RSA private key, p and q, each 1024 bits long, may be generated from the seed by iterating the KDF a certain number of times. That iteration count is the LCV. Moreover, in embodiments, a seed may be 128 or 256 bits long, and each LCV may be stored in a 16 bit number, thus having values between 1 and 65,536. In this manner, for this example private key size, instead of saving M complete RSA keys in fuses 110, which would occupy M*2048 bits total, key encoder 180 stores a significantly condensed version of these M keys on microcontroller 105: a seed 113 and M pairs of 16 bit LCVs 115.

Additionally, key encoder 180 may generate M ECC keys from a seed. Accordingly, key encoder 180 may also store ECC seed 117 in fuses 110. However, for devices already provisioned with RSA private keys, the seed may be the same as that already generated for RSA, and thus no additional seed need be generated specifically for the ECC private keys. Thus, ECC seed 117 is shown in a dashed box, to indicate that it is not necessary where, as shown, the device, here microcontroller 105, has already been provisioned with RSA private keys (and thus seed 113).

Figure 2:
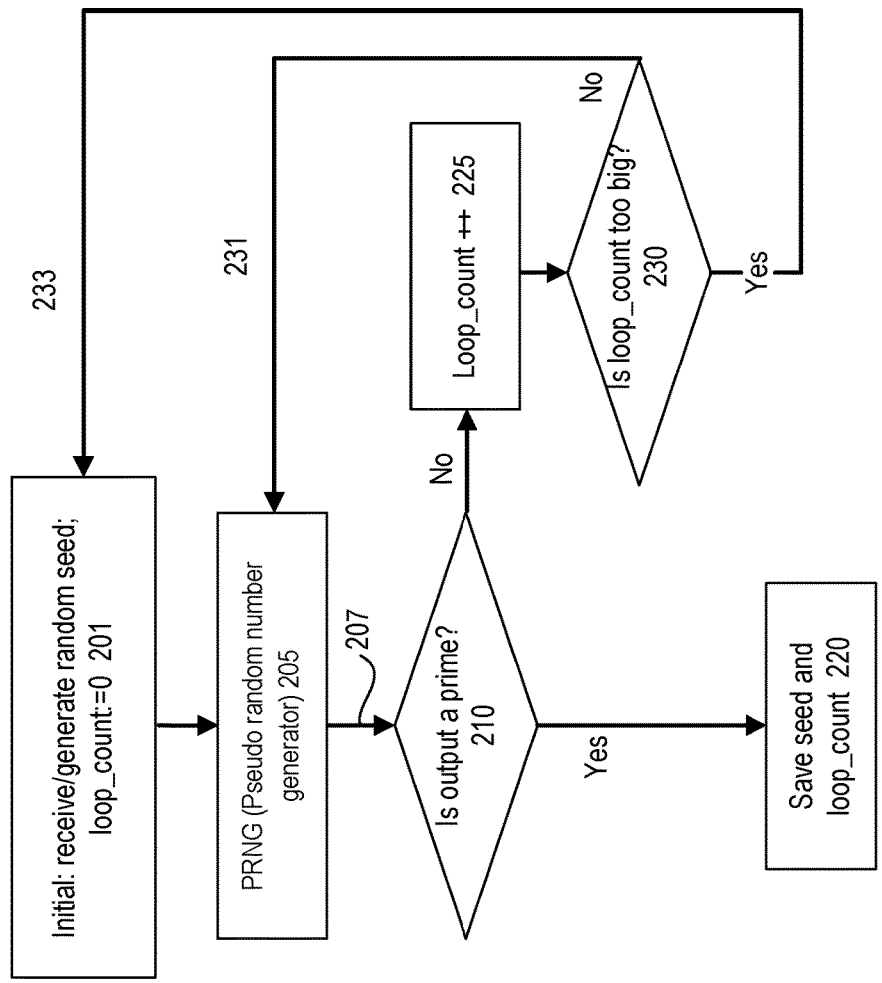
FIG. 2 illustrates process flow of an example process for representing a large prime number as a seed and a loop count, in accordance with various embodiments.
Figure 3:
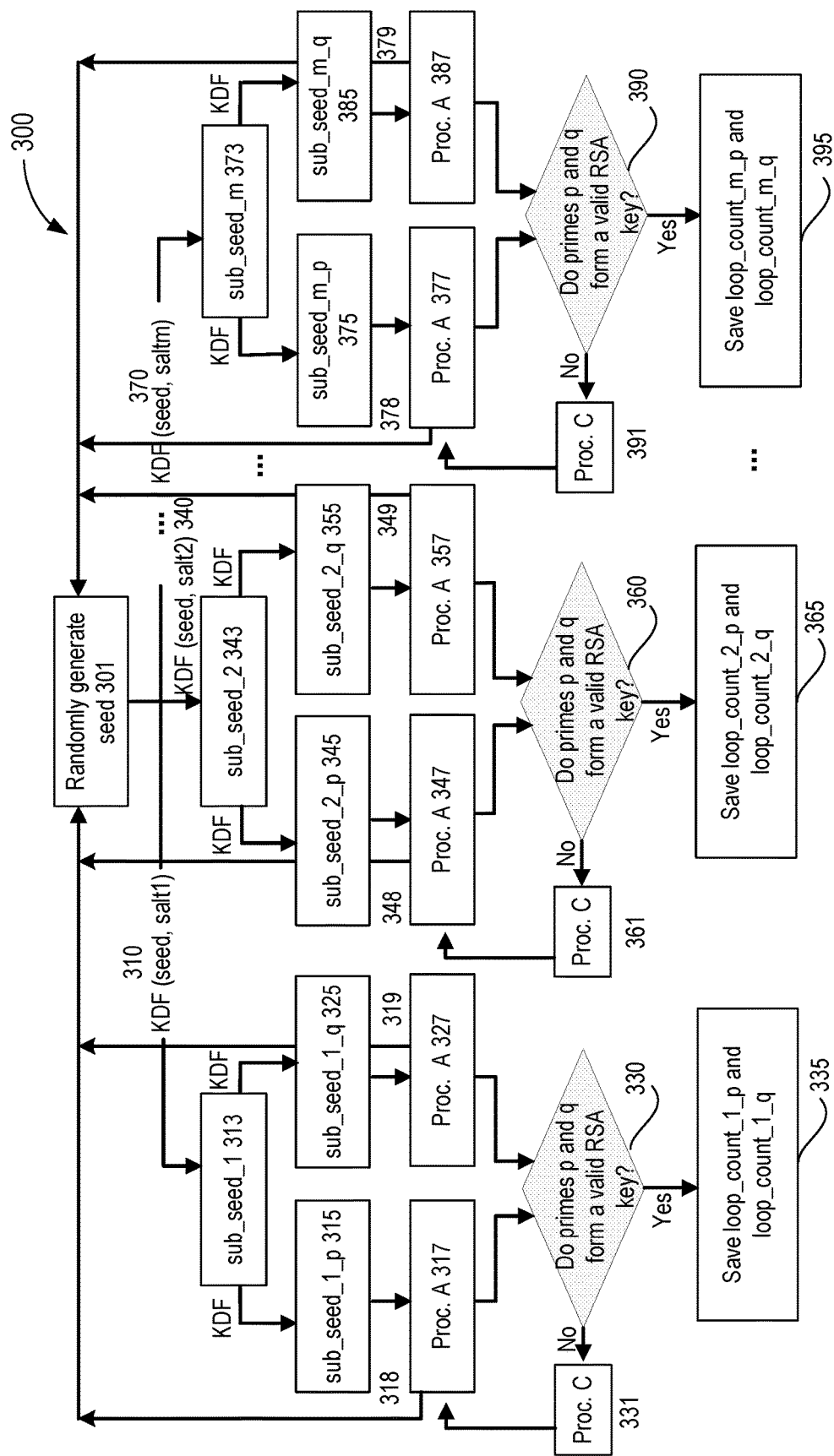
FIG. 3 illustrates process flow of an example process for deriving M RSA keys, each comprising two prime numbers (p,q), from a seed, in accordance with various embodiments.

FIG. 2, next described, illustrates an example prime number generation and compression scheme that, in accordance with various embodiments, is repeatedly used by key encoder 180 to generate the LCVs for 1 to M RSA private keys, as shown in FIG. 3. In embodiments, the process of FIG. 3 repeatedly invokes the process of FIG. 2. The process of FIG. 2 is referred to as "Process A" in the overall process of FIG. 3, and is thus so labeled in FIG. 2. Process A may receive a seed or "subseed", as described below, such as from the process of FIG. 3, and then obtain a prime number from it, by successively applying a KDF. If the received seed does not result in a prime number, then Process A generates a new seed, and proceeds from there. Process A is illustrated by a process flow as shown in FIG. 2 including blocks 201 through 230. In embodiments, Process A may have greater, or fewer, blocks.

With reference to FIG. 2, at block 201, a random seed is received, and loop_count, a variable to store a number of iterations of the process, is set to 0. At block 205 a KDF, here pseudo random number generator 205, operates on the received seed, and generates an output 207. At query block 210 it is determined whether output 207 is a prime number. Thus, query block 210 may be referred to as a prime check. If "Yes" at query block 210, then the random seed and the value of loop_count is stored, and the process stops, having generated a prime number from the seed after one try. If, however, at 210 the return value is "No", then the process moves to block 225, where the value of loop_count is incremented. Once incremented, from block 225 the process moves to block 230, where a check is run to determine whether the value of loop_count is too big. If "Yes" at 230, then the process returns to block 201, along path 233, and starts over with a new seed that it generates. For example, as noted above, if loop_count is to be stored in a 16 bit number, once 65,536 iterations have occurred, the process aborts for that seed, and starts over with a newly generated seed. If, however, the return at loop_count size check block 230 is "No", then the current seed is still viable, and the process returns to block 205, where the output 207 of block 205 is once again input to the KDF at block 205 to generate a new output 207. This process continues until a prime number is obtained at output 207, and verified as such at block 210. Once that occurs, the then current seed and the value of loop_count are stored. It is noted, in particular in the context of using Process A to generate prime numbers for RSA private keys, as described below in connection with FIG. 3, that one can specify the desired size of output from a KDF. Thus any desired RSA private key size (see Table 1 below for example sizes) may be obtained using process 300 of FIG. 3, which calls Process A of FIG. 2.

It is thus noted that the process of FIG. 2 may be used by itself to store a single large prime number in a condensed way. For example, to store a 1024-bit prime number, a compressed form generated as shown in FIG. 2 may include a 128 bit number for the seed, and 16 bits for the loop_count, for a total of 144 bits, thereby using only 144 fuses. In general when using this process, if the seed is s bits and loop_count is n bits, the number of fuses required to store a prime number generated from the seed s is: Total bits=s+n.

In embodiments, the example value of n=16 is chosen so as to increase the probability that a prime number will result from application of Process A. Thus, if n is too small, then the probability that the seed cannot result in a prime number within a n-bit loop count is higher, and a new seed must be generated more often, and when that occurs, the process re-run.

FIG. 3 illustrates an example process 300 for deriving m multiple RSA keys, each key comprising two prime numbers (p,q), from a randomly generated seed in accordance with various embodiments. Process 300 is illustrated by a process flow as shown in FIG. 3 including blocks 301 through 395, for the example case of generating three (3) RSA private keys, in each of three separate processing arms. In embodiments, both process 300, and each parallel processing arm within process 300, may have greater, or fewer, blocks. Process 300 is illustrated for generating m private RSA keys, each key including prime numbers p and q. For ease of illustration, as noted, separate arms for a first, second and m-th private RSA key are shown. Each arm performs the same processing tasks on its inputs. Moreover, within each arm there are two parallel pathways, a first path for the "p" prime number (shown on the left), and a second path for the "q" prime number (shown on the right).

With reference to FIG. 3, at block 301 a seed is randomly generated. For example, the desired RSA key size may be 2048 bits, and the seed may be a 128 or 256 bit integer. From block 301 process 300 splits into three arms, a first arm that ends at block 335, a second arm that ends at block 365, and a m-th arm that ends at block 395. Beginning with the first arm at 310, a KDF is applied to the seed and a "salt", here salt1. The KDF may be, for example, a pseudo random number generator, or, for example, a hash function, such as keyed hashed message authentication code (HMAC). In embodiments, the KDF outputs a fixed bit sized number, the same size (e.g., 128 or 256 bits) as the original seed input. Thus, at blocks 313, 343 and 373 the KDF here outputs a same size (e.g., 128 or 256 bits) of "sub_seed_x" as the size of the input "seed" generated at block 301. Additionally, at each of blocks 315, 325, 345, 355, 375 and 385, "sub_seed_x_p" through "sub_seed_m_q" are each also the same size as their "parent" sub-seeds_x, where x is 1 through m. It is these respective pairs of sub_seed_x_p and sub_seed_x_q that are respectively input to Process A at each of blocks 317, 327, 347, 357, 377 and 387. These inputs to Process A are also the same size as their "sub_seed_x" parents, e.g., 128 or 256 bit seeds. Process A, in each case, then outputs an RSA pair (p,q), each of which is ½ the desired RSA key size, e.g., 2048. Other RSA key sizes are also possible, as shown in Table 1 below.

Continuing with reference to FIG. 3, the operation of the KDF on (seed, salt1) at 310 results in a sub seed for the first arm, sub_seed_1, at block 313. It is noted that a KDF operation takes two inputs. One input is the seed, which is usually a 128 or 256 bit pseudo random number, as noted, which is kept secret. The other input to the KDF is a salt, which may be any size, usually an ASCII context such as literally "s1". The salt is usually not kept as a secret.

Figure 7:
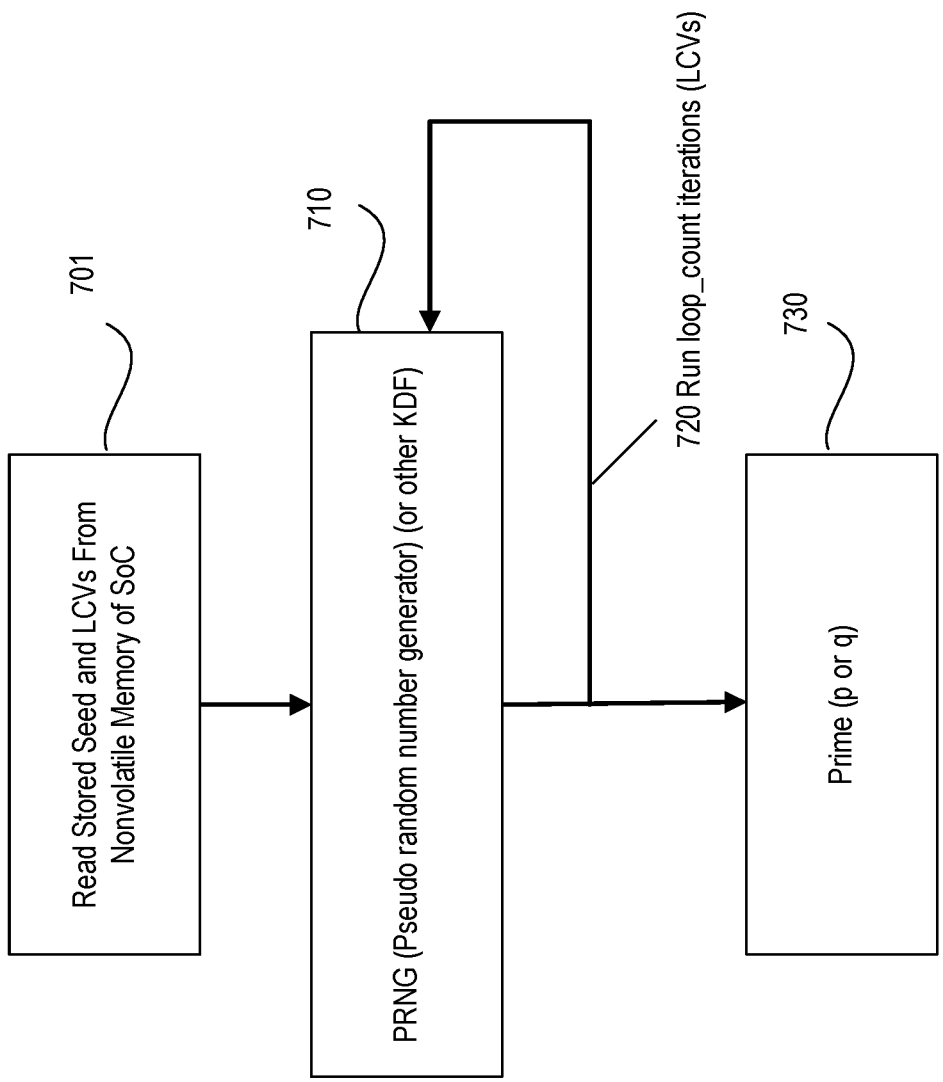
FIG. 7 illustrates process flow of an example process for recovering M RSA private keys using a stored seed and, for each of the M keys, a pair of loop counter values (LCVs), such as are generated in FIG. 3, in accordance with various embodiments.

It is noted that the process of FIG. 3, from the seed and m different "salts", derives m sub seeds "sub_seed_x" (1<=x<=m). Further, at decoding time the salts may be supplied by code (e.g., of a key decoder, as illustrated in FIG. 7) and thus need not be ultimately stored in the set of fuses on the device being provisioned when the seed and LCVs are generated. In embodiments, an example salt may be as simple as the integer "x" itself. Once the sub seeds 313, 343, . . . , 373 are derived, from each sub_seed_x and additional salts (not shown in FIG. 3 to make it easy to read), a seed for p (sub_seed_x_p) and a seed for q (sub_seed_x_q) are also each derived using the KDF function. As above, in embodiments, the salts used at blocks 313, 343 and 373 may also be supplied by a decoder code and thus need not ultimately use fuse space. In embodiments, the salts for each of p and q may be the same for all m private keys, but must be different for p and q in any one processing arm. In other words, sub_seed_x_p != sub_seed_x_q and all sub_seed_x_p and sub_seed_x_q must be different for all RSA keys x, where 1<=x<=m.

From block 313 process flow splits into two parallel paths, one for the p prime number, the other for the q prime number, of the RSA private key being generated in that particular processing arm (e.g., 1, 2 . . . m). Then, as noted, at the beginning of each path, from sub_seed_1 and salts, a seed for p (sub_seed_1_p) and a seed for q (sub_seed_1_q) are each derived using a KDF function. The leftmost arm, which is used to obtain 1_p, the p value for the first RSA key, will be described first.

Thus, continuing with reference to FIG. 3, in the first (leftmost) processing arm (x=1), and in the "p" processing path of the first processing arm, at block 313 sub_seed_1 is operated on by the KDF another time, to yield a second sub seed, specific to the "p" prime number of the first RSA key, which yields sub_seed_1_p at block 315. From block 315 process flow moves to block 317, where sub_seed_1_p is input as the "seed" to Process A of FIG. 2, e.g., at block 201 of FIG. 2. Similarly, in the "q" processing path of the first processing arm, at block 313 sub_seed_1 is operated on by the KDF another time, to yield a second sub seed, specific to the "q" prime number of the first RSA key, to yield sub_seed_1_q at block 325. From block 325 process flow moves to block 327, where sub_seed_1_q is input as the "seed" to Process A of FIG. 2, e.g., at block 201 of FIG. 2.

Continuing with reference to FIG. 3, the output of Process A on sub_seed_1_p 315, which is a first iteration of prime number 1_p, and the output of Process A on sub_seed_1_q 327, which is a first iteration of prime number 1_q, are both input to query block 330, where it is determined whether these versions of primes 1_p and 1_q form a valid RSA key. For example, there are, in addition to being prime numbers, certain other criteria that must be satisfied by p and q to constitute a valid RSA private key pair. Thus, not all combinations of two primes generated at blocks 317 and 327 can form a valid RSA key. Rather, there are other requirements for p and q. For example, p and q cannot be too close. The public exponent e must be coprime with the least common multiple of p-1 and q-1, or 1 cm(p-1, q-1). At a minimum, the resultant (p,q) pair must meet the RSA key validity requirements specified in National Institute of Standards and Technology (NIST), Federal Information Processing Standards (FIPS) 186-4 "Digital Signature Standard" available at the nist.gov website.

In embodiments, if prime number pair (p,q) does not meet the requirements at 330, and thus a "No" is returned at query block 330, then Process C is run. Process C simply increments the loop count of p or q, as appropriate, and continues to look for the next prime by re-running the processing arm for either p or q, as appropriate, at blocks 317 or 327. It is here noted that p and q are identical in their properties. Therefore, changing one of p and q is sufficient, and it does not matter whether it is p or q. Alternatively, while unnecessary, in embodiments, both p and q may be changed.

Although the Process C block is only shown on one side of each of the three processing arms in FIG. 3, it is noted that the arrow coming out of Process C 331 does not touch either the "p" or the "q" processing pathways. This is to indicate that, as noted, either the p or the q processing paths may be incremented and Process A run again on their respective prime number intermediate results. The drawing of the "Proc. C" blocks 331, 361, 391 on only one side of each processing arm is due to there not being sufficient space in FIG. 3 to draw in the "Proc. C" block on each side of each processing arm.

Once the return at query block 330 is a "Yes", and thus a valid (p,q) pair found for that RSA key, then at 335, the loop count values for each of 1_p and 1_q are saved.

In identical fashion as described above for the first processing arm, processing is performed for each additional processing arm, one RSA key pair being derived in each arm. Thus, for the second processing arm, from block 301, by operating the KDF on (seed, salt2) at 340, sub_seed_2 is generated at block 343. From block 343 process flow splits into two parallel paths, one for the p prime number, the other for the q prime number, of the second RSA private key. At the beginning of each of these paths, from sub_seed_2 and salts, a sub seed for p (sub_seed_2p) and a sub seed for q (sub_seed_2_q) is derived using the KDF function, as follows. In the "p" processing path of the second processing arm, at block 343 sub_seed_2 is operated on by the KDF another time, to yield a second sub seed, specific to the "p" prime number of the first RSA key, which yields sub_seed_2_p at block 345. From block 345 process flow moves to block 347, where sub_seed_2_p is input as the "seed" to Process A of FIG. 2, e.g., at block 201 of FIG. 2. Similarly, in the "q" processing path of the second processing arm, at block 343 sub_seed_2 is operated on by the KDF another time, to yield a second sub seed, specific to the "q" prime number of the second RSA key, which yields sub_seed_2_q at block 355. From block 355 process flow moves to block 357, where sub_seed_2_q is input as the "seed" to Process A of FIG. 2, e.g., at block 201 of FIG. 2.

Continuing with reference to FIG. 3, the output of Process A on sub_seed_2_p 345, which is a first iteration of prime number 2_p, and the output of Process A on sub_seed_2_q 357, which is a first iteration of prime number 2_q, are both input to query block 360, where it is determined whether primes p and q form a valid RSA key, based on the criteria described above. In embodiments, if prime number pair (p, q) does not meet the requirements at query block 360, and thus a "No" is returned at query block 360, then Process C is run. As noted, Process C is to increment the loop count of p or q, as appropriate, and continue to look for the next prime. As noted above, although the Proc. C block is only shown on one side of each processing arm in FIG. 3, the arrow coming out of Proc. C 361 does not touch either the "p" or the "q" processing pathways in the second processing arm. This is to indicate that either the p or the q processing paths may be incremented, and Process A run again on either (or both, when appropriate) of their respective prime number intermediate results.

Once the return at query block 360 is a "Yes", then at 365, the loop count values for each of 2_p and 2_q are saved. In embodiments, there may be several additional processing arms for RSA keys between the second processing arm and the m-th, shown at the far right of FIG. 3, depending on the value of m.

Finally, in the rightmost and final processing arm, to derive the loop_count values for each of the p and q prime numbers of the m-th RSA private key, for the m-th processing arm, from block 301, by operating the KDF on (seed, saltm) at 370, sub_seed_m is generated at block 373. From block 373 process flow splits into two parallel paths, one for the p prime number, the other for the q prime number, of the m-th RSA private key. At the beginning of each of these paths, from sub_seed_m and salts, a sub seed for p (sub_seed_m_p) and a sub seed for q (sub_seed_m_q) are derived using the KDF function, as next described.

In the "p" processing path of the m-th processing arm, at block 373 sub_seed_m is operated on by the KDF another time, to yield an m-th sub seed, specific to the "p" prime number of the first RSA key, which yields sub_seed_m_p at block 375. From block 375 process flow moves to block 377, where sub_seed_m_p is input as the "seed" to Process A of FIG. 2, e.g., at block 201 of FIG. 2. Similarly, in the "q" processing path of the m-th processing arm, at block 373 sub_seed_m is operated on by the KDF another time, to yield an m-th sub seed, specific to the "q" prime number of the m-th RSA key, which yields sub_seed_m_q at block 385. From block 385 process flow moves to block 387, where sub_seed_m_q is input as the "seed" to Process A of FIG. 2, e.g., at block 201 of FIG. 2.

Continuing with reference to FIG. 3, the output of Process A on sub_seed_m_p 375, which is a first iteration of RSA prime number m_p, and the output of Process A on sub_seed_m_q 387, which is a first iteration of RSA prime number m_q, are both input to query block 390, where it is determined whether primes m_p and m_q form a valid RSA key, based on the criteria described above. In embodiments, if prime number pair (p,q) does not meet the requirements at 390, and thus a "No" is returned at query block 390, then Process C is run. As noted, Process C is to increment the loop count of m_p or m_q, as appropriate, and continue to look for the next prime. As noted above, although the Proc. C block is only shown on one side of each processing arm in FIG. 3, the arrow coming out of Proc. C 391 does not touch either the "p" or the "q" processing pathways in the second processing arm. This is to indicate that either the p or the q processing paths may be incremented, and Process A run again on either (or both, when appropriate) of their respective prime number intermediate results.

It is also noted, that just as shown in FIG. 2 at return path 233 from block 230, in case loop_count becomes too large before a prime number output is obtained at 207, similarly, in FIG. 3 there is a return path back to block 301, in each processing arm, from Process A in each of the "p" and "q" pathways of that processing arm. Thus, in the first (leftmost) processing arm from blocks 317 and 327 there are return pathways 318 and 319, respectively, to block 301. In the second (middle) processing arm, from blocks 347 and 357 there are return pathways 348 and 349, respectively, to block 301, and finally, in the third (rightmost) processing arm, from blocks 377 and 387 there are return pathways 378 and 379, respectively, to block 301. Thus, the seed at the very beginning, at block 301, needs to be regenerated if any arm cannot find a valid RSA keypair. Return pathways 318, 319, 348, 349, 378 and 379 provide that functionality. In FIG. 3, return pathways 319, 348, 349 and 379 are drawn to appear behind blocks that are above them, for ease of reading the figure.

Continuing with reference to query block 390, once the return at query block 390 is a "Yes", then at 395, the loop count values for each of m_p and m_q are saved. The seed and each p and q loop_count, for each of the m RSA private keys (these are the LCVs), are then saved in nonvolatile storage, such as, for example, by burning them in security fuses of a device, such as, for example, microcontroller 105 of FIG. 1.

As noted above with reference to FIG. 1, in embodiments, the process of FIG. 3 is implemented in a key encoder, which may run on a separate computing device during manufacturing, or alternatively, "offline" by a trusted key generation server before manufacturing. It is the output of the key encoder, running process 300, which is the randomly generated seed and the M sets of LCVs, that are stored on the microcontroller 105, or SoC 150, of FIG. 1, for example in fuses.

In summary: for a seed of s bits, and a loop count of n bits, the number of fuses required to store m RSA keys is:

$$s+2 \cdot n \cdot m.$$

Thus, if 16 bits are used to represent a loop count, then it takes 32 fuses to store the LCVs of each RSA key.

Thus, as an example, to store eight RSA private keys, Table 1 below compares the number of fuses required by various techniques for three different example key sizes. As shown in the rightmost two columns, processes according to various embodiments result in significant savings in required numbers of fuses.

TABLE 1

| RSA key size | Uncompressed size of 8 keys | s | n | Compressed using Process A by itself | Fuses | Compressed according to various embodiments | |
|---|---|---|---|---|---|---|---|
| | | | | | | Savings vs. uncompressed | Savings vs. Process A (FIG. 2) |
| 2048 | 16,384 | 256 | 16 | 2,304 | 512 | 96.9% | 77.8% |
| 3072 | 24,576 | 384 | 16 | 3,328 | 640 | 97.4% | 80.8% |
| 4096 | 32,768 | 512 | 16 | 4,352 | 768 | 97.7% | 82.4% |

It is noted that in embodiments, in order to have sufficient entropy in the seed, so as to derive the necessary p and q prime numbers for each private key, a minimum acceptable seed size for RSA key derivation is as follows: 2048-bit RSA: 112 bits; 3072-bit RSA: 128 bits; 4096-bit RSA: 156 bits.

Figure 4:
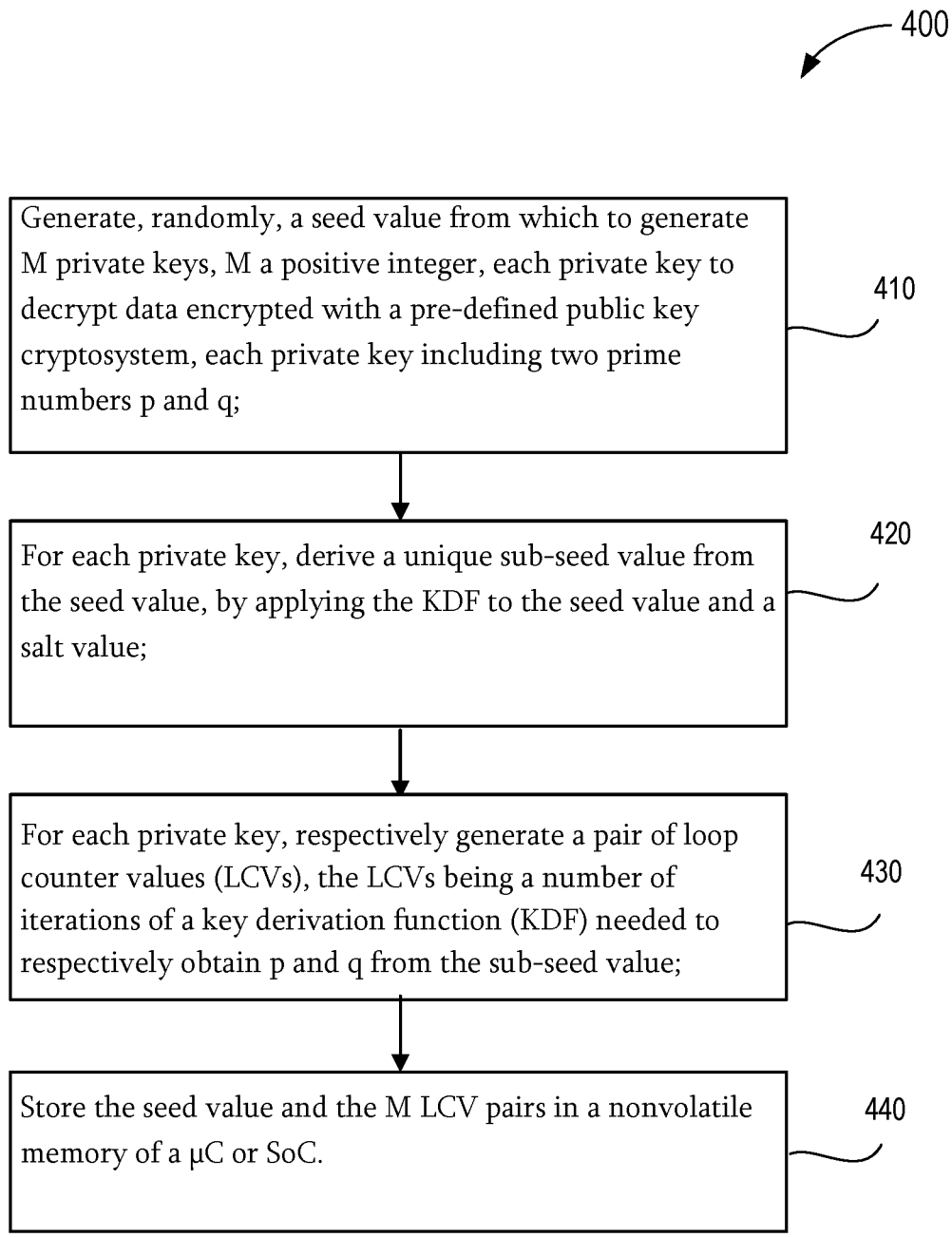
FIG. 4 illustrates an overview of the operational flow of a process for generating and storing a seed value and M RSA private keys, in accordance with various embodiments.

Referring now to FIG. 4, an overview of the operational flow of a process 400 for generating and storing a seed value and M RSA private keys, in accordance with various embodiments, is presented. Process 400 may be performed by key encoder 180, for example, as shown in FIG. 1, in accordance with various embodiments. Process 400 may include blocks 410 through 440. In alternate embodiments, process 400 may have more or less operations, and some of the operations may be performed in different order.

Process 400 begins at block 410, where a seed value is randomly generated from which to generate M private keys, where M is a positive integer, each private key to decrypt data encrypted with a pre-defined public key cryptosystem, each private key including two prime numbers p and q.

From block 410, process 400 proceeds to block 420, where, for each private key, a unique sub-seed value is derived from the seed value, by applying the KDF to the seed value and a salt value. From block 420, process 400 moves to block 430, where, for each private key, a pair of loop counter values (LCVs) is respectively generated, the LCVs being a number of iterations of a KDF needed to respectively obtain p and q from the sub-seed value. From block 430, process 400 moves to block 440, where, the seed value and the M LCV pairs are stored in a non-volatile memory of a microcontroller or a SoC. For example, the seed value and the M LCV pairs may be stored in fuses 110 of microcontroller 105 of FIG. 1.

Figure 5:
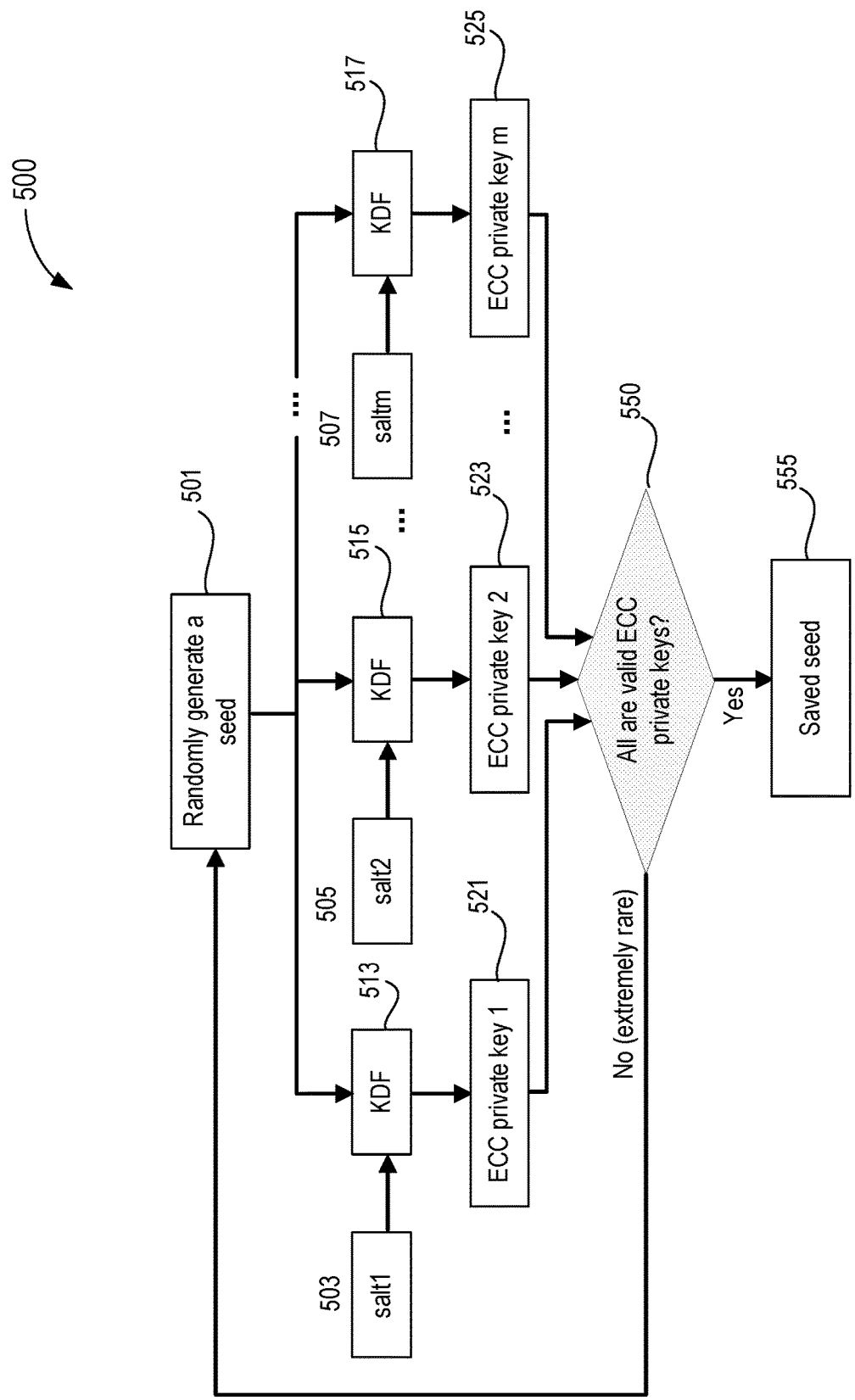
FIG. 5 illustrates process flow of an example process for deriving M ECC private keys from a seed, in accordance with various embodiments.

FIG. 5 illustrates process flow of an example process for deriving M ECC private keys from a seed, in accordance with various embodiments. It is noted that an ECC private key is a large integer that satisfies requirements also specified in the NIST, FIPS 186-4 "Digital Signature Standard" document, which is, as noted above, available at the nist.gov website.

It is noted that almost all k-bit random integers may serve as a valid private key for a k-bit ECC curve. This fact makes storage encoding for multiple ECC private keys simpler than that of RSA keys, which was described in detail with reference to FIG. 3, above. With reference to FIG. 5, as shown, m ECC private keys may be generated from the same seed. Process 500 begins at block 501, where a seed is randomly generated, as was the case for the RSA seed 301, described above. In embodiments, the seed randomly generated at block 501 is of the same size as the m ECC private keys to be generated. As noted above, however, if a seed for RSA key generation has already been created on a computing device, that same seed may be used for ECC key generation. In that case the random generation at block 501 may be replaced with "obtain the previously generated RSA seed." The seed size must be >=ECC key size. To minimize seed value, in embodiments, seed size may be set equal to ECC key size. Thus, in such embodiments, a 256-bit seed is used to generate 256-bit ECC keys. It is noted that, for the same security strength, RSA has a much greater key size than ECC (and hence ECC is more advanced and more efficient than RSA). Accordingly, in embodiments, a 256-bit seed may be used to generate both 2048-bit RSA private keys and 256-bit ECC private keys.

From block 501, process 500 bifurcates into a separate processing arm for each of the m ECC keys to be generated. In each of the m processing arms, a KDF is run on the seed and a salt, saltx, where 1<=x<=m. As in the case of the RSA key generation process, the value of saltx may be supplied by code and this need not be stored in fuses. In embodiments, the value of saltx can be as simple as the integer "x" itself.

Thus, for example, at block 513, the KDF is applied to inputs (salt1, seed), to output ECC private key 1 at block 521, where salt1 is stored at block 503. Similarly, in a second processing arm of process 500, at block 515, the KDF is applied to inputs (salt2, seed), to output ECC private key 2 at block 523, where salt 2 is stored at block 505. This processing is repeated, in parallel, in each of the processing arms (not shown) between the second processing arm and the m-th processing arm. Thus, in the m-th and last processing arm of process 500, at block 517, the KDF is applied to inputs (saltm, seed), to output ECC private key m, at block 525, where saltm is stored at block 507. From blocks 521, 523 and on through block 525, which are input into block 550, process 500 moves to query block 550, where it is determined whether the generated ECC private keys 1 through m are valid ECC private keys. If they are, and query block 550 returns a "Yes", then process 500 moves to block 555, where the ECC seed is saved. If it is already saved as an RSA seed, then at block 555 it is simply confirmed that the same seed as previously stored on the computing device for RSA key derivation may also be used as the ECC seed.

If, however, query block 550 returns a "No"—which is extremely rare—then process 500 moves to block 501, and a new seed is generated, and the process repeated for that new seed. Thus, in the event (albeit very rare) that an existing RSA seed results in a "No" at query block 550, then a different ECC seed would be stored on the computing device, or, for example, a key encoder may jump to block 301 of FIG. 3, and rerun RSA key generation with a new seed.

Using the technique of process 500, the fuses needed to store m ECC keys are the same as the fuses needed to store one ECC key. As noted above, on a system that also uses RSA, the seed can be the same seed used for RSA.

Figure 6:
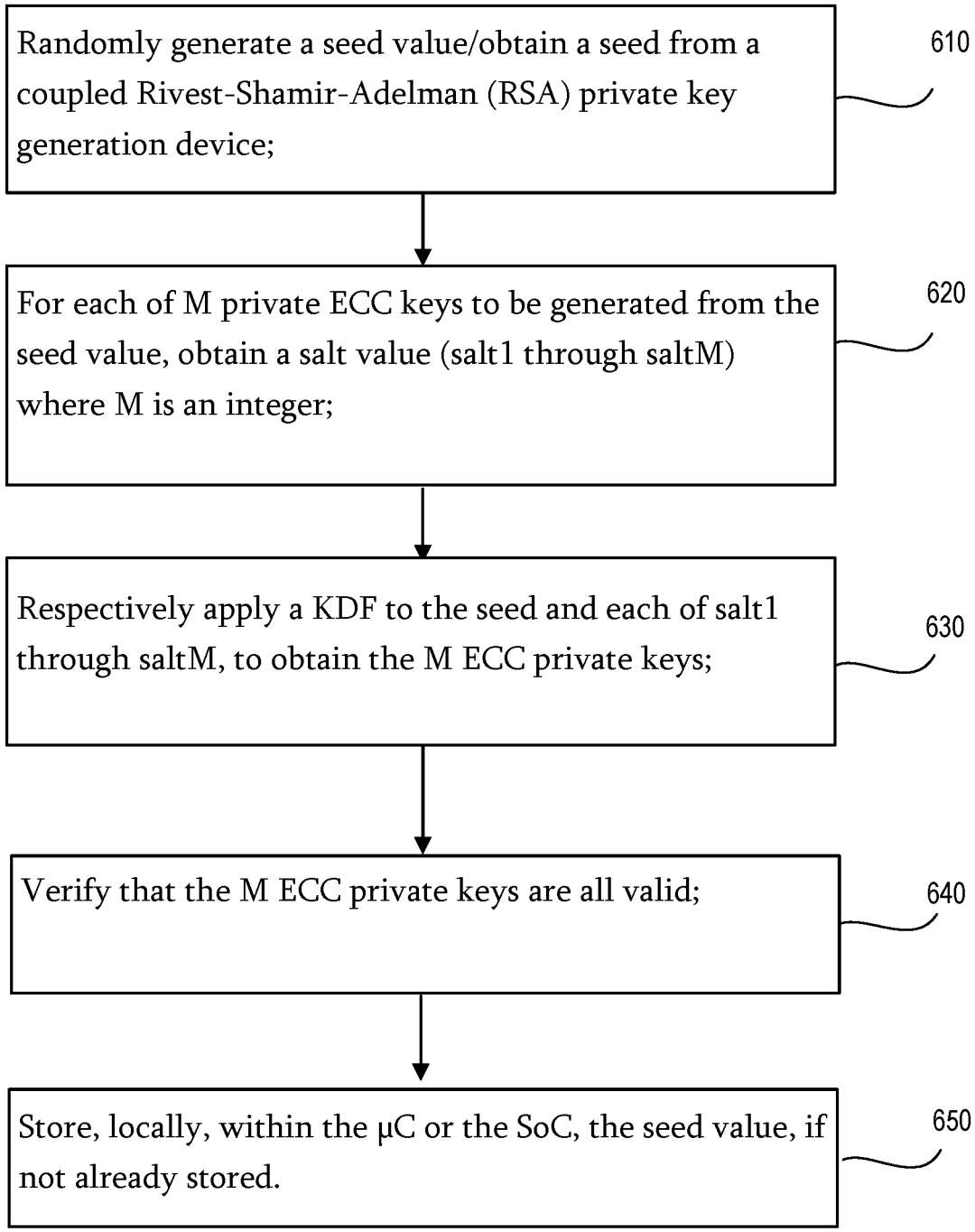
FIG. 6 illustrates an overview of the operational flow of a process for generating and storing a seed value with which to generate M ECC keys, in accordance with various embodiments.

Referring now to FIG. 6, an overview of the operational flow of a process 600 for generating and storing a seed value with which to generate M ECC keys, in accordance with various embodiments, is presented. Process 600 may be performed by, for example, key encoder 180 as shown in FIG. 1, in accordance with various embodiments. Process 600 may include blocks 610 through 650. In alternate embodiments, process 600 may have more or less operations, and some of the operations may be performed in different order.

Process 600 begins at block 610, where a seed value is randomly generated, or alternatively, obtained from a coupled RSA private key generation device. In embodiments, the device may be the same device as that performing process 600, such as key encoder 180 of FIG. 1.

From block 610, process 600 proceeds to block 620, where, for each of the M private ECC keys, a salt value is obtained, (salt1 through saltM). In embodiments, the value of saltx (1<=x<=m) may be supplied by code. In embodiments, the value of saltx may be as simple as the integer "x" itself.

From block 620, process 600 moves to block 630, where, for each private key, a KDF is respectively applied to the seed and each of salt1 through saltM, to obtain M ECC private keys. From block 630, process 600 moves to block 640, where it is verified that the M ECC private keys are valid. From block 640, process 600 moves to block 650, where, if not already stored, the seed value is stored within a microcontroller or a SoC. For example, the seed value may be stored by key encoder 180 in fuses 110 of microcontroller 105 of FIG. 1. If, however, the seed is the same as a RSA seed already stored in the microcontroller or a SoC (e.g., by key encoder 180 when it provisioned the microcontroller or SoC with a RSA seed), it need not be stored once again.

Although not shown in FIG. 6, but as shown in FIG. 5, in the very rare event that at block 640 it is determined that the M ECC private keys are not all valid ECC private keys, process 600 returns to block 610 and randomly generates another seed value, and then repeats process 600 with that new seed value.

FIG. 7 illustrates process flow of an example process 700 for recovering M RSA private keys using a stored seed and, for each of the M keys, a pair of loop counter values (LCVs), such as are generated using process 300 of FIG. 3, in accordance with various embodiments. FIG. 7 thus illustrates an inverse process to that of Process A. Process 700 generates actual private RSA keys on a given device by recreating the process of FIG. 2 using the original seed and loop_count values that a key encoder generated and stored in NVM of a device. In embodiments, process 700 may be performed by key decoder 120 of FIG. 1. Process 700 is illustrated by a process flow as shown in FIG. 7 including blocks 701 through 730. In embodiments, process 700 may have greater, or fewer, blocks.

Thus, with reference to FIG. 7, at 701 the stored seed value is obtained, for example, by reading its value from fuses 110 in FIG. 1. Thus, the seed of block 701 may be seed 113 of FIG. 1, for example. From block 701 process 700 moves to block 710, where it operates on the seed using a KDF, such as, for example, a pseudo random number generator, as shown, or, for example, an HMAC (not shown). At block 710, process 700 runs a loop 720 applying the KDF the required number of times, e.g., the stored value of loop_counter for either the "p" or the "q" prime number component of a given RSA private key, to, at block 730, yield the desired prime number p or q, to be used as part of a given private RSA key. Thus, to decode the actual RSA private key, process 700 must be run on each element of an LCV pair stored at 115 of FIG. 1, for example, to generate both p and q, and thus the pair (p,q). In embodiments, process 700 is repeated M*2 times for each (p,q) of the M RSA private keys to be regenerated on the device.

Figure 8:
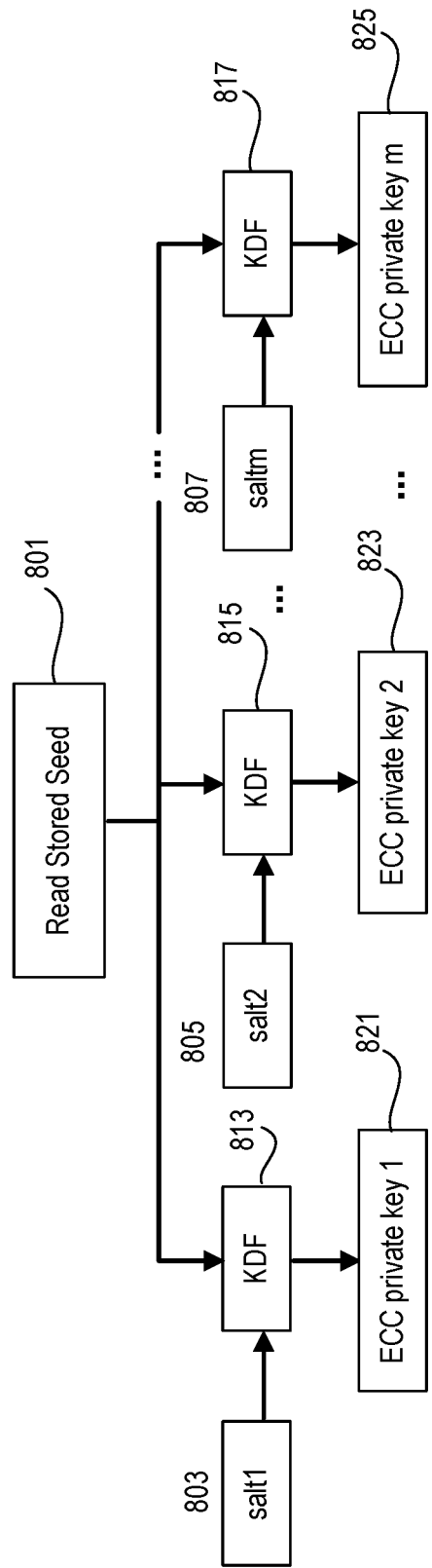
FIG. 8 illustrates process flow of an example process for recovering M ECC private keys using a stored seed, in accordance with various embodiments.

Similarly, FIG. 8 illustrates process flow of an example process 800 for recovering M ECC private keys using a stored seed, in accordance with various embodiments. FIG. 8 thus illustrates an inverse process to that of ECC encoding process 500. Process 800 generates actual private ECC keys by recreating part of the process of FIG. 5 using the original stored seed value that a key encoder generated and stored in NVM of a device. In embodiments, process 800 may be performed by key decoder 120 of FIG. 1. Process 800 is illustrated by a process flow as shown in FIG. 8 including blocks 801 through 825. In embodiments, process 800 may have greater, or fewer, blocks.

Process 800 is very similar to process 500 of FIG. 5, except that in process 800, instead of randomly generating the seed, as at block 501 of FIG. 5, a previously stored seed value on the device is read out of NVM. Moreover, once the M ECC keys are regenerated, at blocks 821 through 825, process 800 ends, without including the verification shown at query block 550 of FIG. 5, it being already known at the time of encoding that M valid ECC keys may be regenerated from the seed value that was stored on the device.

Process 800 begins at block 801, where a seed is obtained from NVM of a device. For example, process 800 may read seed 117 from fuses 110 of FIG. 1. Or, for example, if the device is also provisioned with multiple RSA private keys, the same seed already stored for the RSA private key regeneration may also be used for ECC private key regeneration. Thus, for example, seed 113 of microcontroller 105, which is part of a RSA private key provisioning on the device, may also be used for regeneration of the M ECC private keys according to process 800.

From block 801, process 800 bifurcates into a separate processing arm for each of the M ECC keys to be generated. In each of the M processing arms, a KDF is run on the seed and a salt, saltx, where 1<=x<=m. As in the case of the ECC private key generation process of FIG. 5, the value of saltx may be supplied by code and this need not be stored in fuses. In embodiments, the value of saltx can be as simple as the integer "x" itself.

Thus, for example, at block 813, the KDF is applied to inputs (salt1, seed), to output ECC private key 1 at block 821, where salt1 is stored at block 803. Similarly, in a second processing arm of process 800, at block 815, the KDF is applied to inputs (salt2, seed), to output ECC private key 2 at block 823, where salt 2 is stored at block 805. This processing is repeated, in parallel, in each of the processing arms (not shown) between the second processing arm and the M-th processing arm. Thus, in the M-th and last processing arm of process 800, at block 817, the KDF is applied to inputs (saltm, seed), to output ECC private key m, at block 825, where saltm is stored at block 807.

Figure 9:
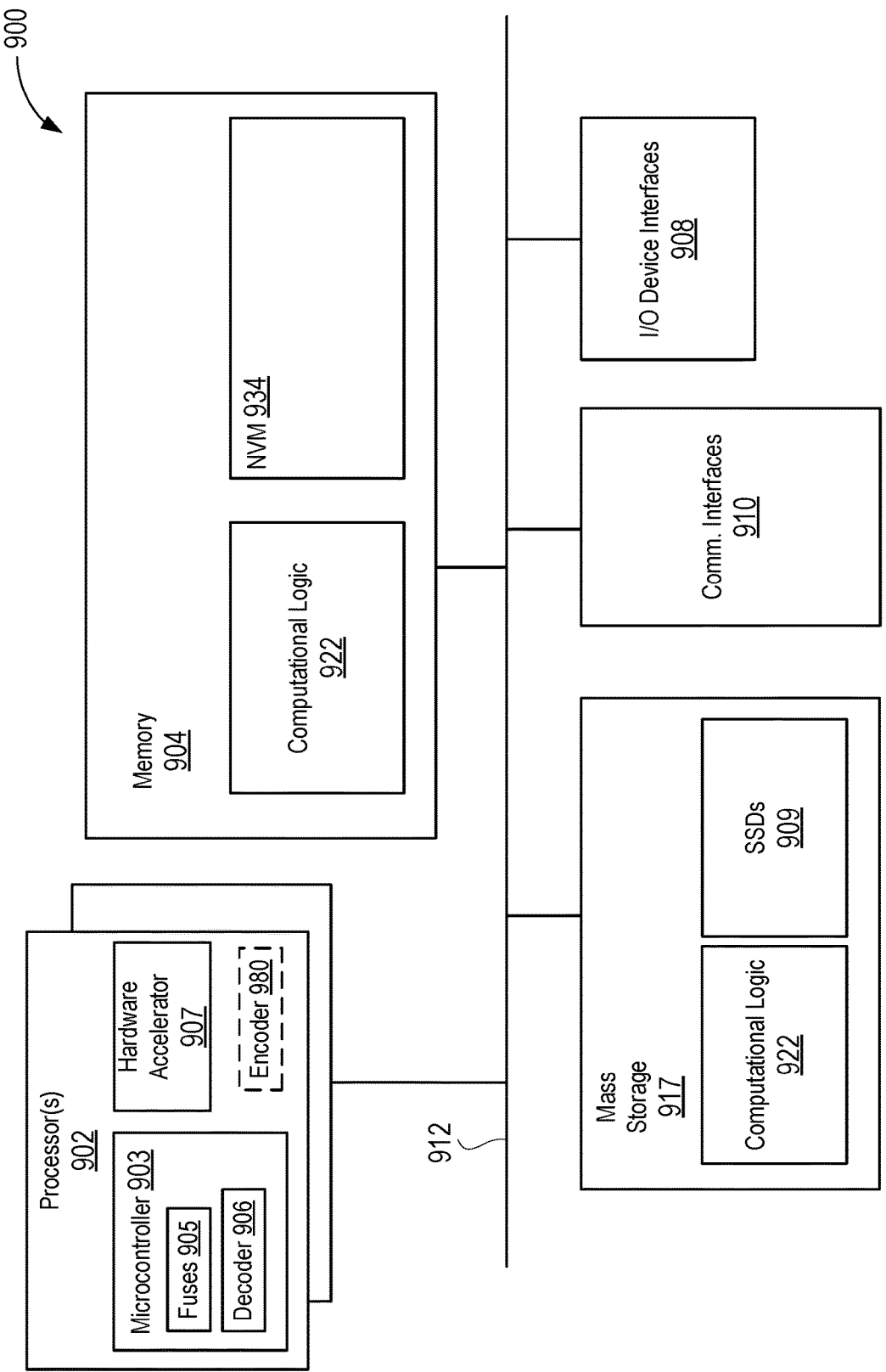
FIG. 9 illustrates a block diagram of a computer device suitable for practicing the present disclosure, in accordance with various embodiments.

Referring now to FIG. 9 wherein a block diagram of a computer device suitable for practicing the present disclosure, in accordance with various embodiments, is illustrated. As shown, computer device 900 may include one or more processors 902, and system memory 904. Each processor 902 may include one or more processor cores, and hardware accelerator 907. An example of hardware accelerator 907 may include, but is not limited to, programmed field programmable gate arrays (FPGA). Processor 902 may include μC 903, which may include a set of fuses 905, to store both a random seed and data, e.g., loop counter values, to regenerate multiple RSA private keys from the seed. μC 903 may also include key decoder 906 to read the stored random seed and the multiple RSA private key data, and to regenerate the multiple private keys therefrom. Key decoder 906 may also read the seed stored in fuses 905, and regenerate multiple ECC private keys from the same seed. Alternatively, computer device 900 may not be used as a decoding device, and thus may not include μC 903, fuses 905, and key decoder 906, but rather, may be used as an encoding device, and, in such case, processor 902 may thus include key encoder 980 (shown in a dashed box to indicate this alternative configuration of computer device 900) to randomly generate a seed, and generate multiple RSA and/or ECC private keys from the randomly generated seed, for provisioning another device with such private keys. When computer device functions as an encoding device, it does not have μC 903, fuses 905, and key decoder 906, but rather, encoder 980 writes a randomly generated seed and loop counter values to fuses of a separate μC, as described above in connection with FIG. 3.

In embodiments, system memory 904 may include any known volatile or non-volatile memory, including, for example, NVM 934. Additionally, computer device 900 may include mass storage device(s) 906 (such as SSDs 909), input/output device interfaces 908 (to interface with various input/output devices, such as, mouse, cursor control, display device (including touch sensitive screen), and so forth) and communication interfaces 910 (such as network interface cards, modems and so forth). In embodiments, communication interfaces 910 may support wired or wireless communication, including near field communication. The elements may be coupled to each other via system bus 912, which may represent one or more buses. In the case of multiple buses, they may be bridged by one or more bus bridges (not shown).

In embodiments, system memory 904 and mass storage device(s) 917 may be employed to store a working copy and a permanent copy of the executable code of the programming instructions of an operating system, one or more applications, and/or various software implemented components of key decoder 120 of FIG. 1, or decoder 906 of FIG. 9, or, alternatively, of key encoder 180 of FIG. 1, or encoder 980 of FIG. 9, collectively referred to as computational logic 922. The programming instructions implementing computational logic 922 may comprise assembler instructions supported by processor(s) 902 or high-level languages, such as, for example, C, that can be compiled into such instructions. In embodiments, some of computing logic may be implemented in hardware accelerator 907. In embodiments, part of computational logic 922, e.g., a portion of the computational logic 922 associated with the runtime environment of the compiler may be implemented in hardware accelerator 907.

The permanent copy of the executable code of the programming instructions or the bit streams for configuring hardware accelerator 907 may be placed into permanent mass storage device(s) 906 and/or hardware accelerator 907 in the factory, or in the field, through, for example, a distribution medium (not shown), such as a compact disc (CD), or through communication interfaces 910 (from a distribution server (not shown)).

The number, capability and/or capacity of these elements 902-980 may vary, depending on the intended use of example computer device 900, e.g., whether example computer device 900 is a smartphone, tablet, ultrabook, a laptop, a server, a set-top box, a game console, a camera, and so forth. The constitutions of these elements 910-980 are otherwise known, and accordingly will not be further described.

Figure 10:
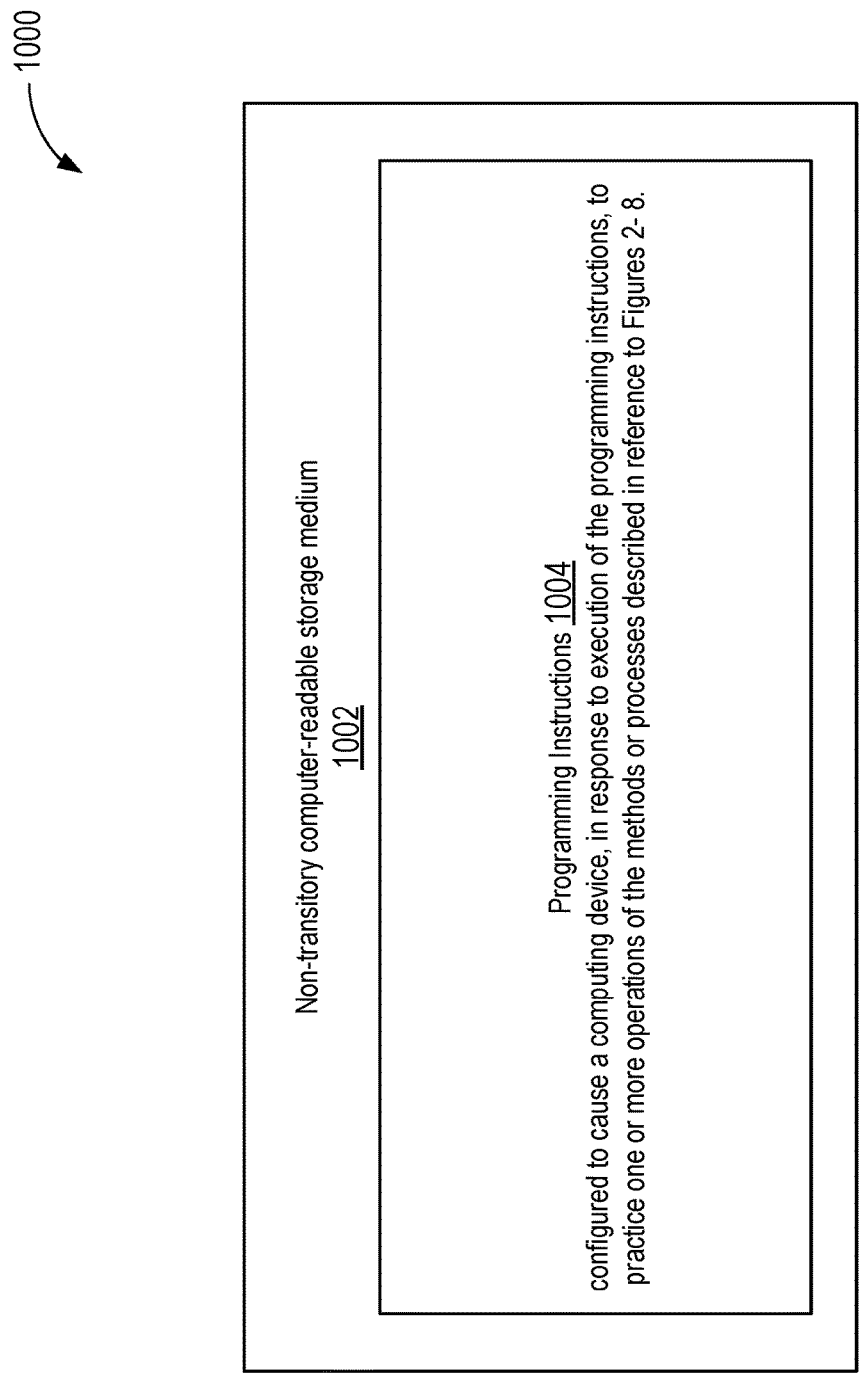
FIG. 10 illustrates an example computer-readable storage medium having instructions configured to practice aspects of the processes of FIGS. 2-6, in accordance with various embodiments.

FIG. 10 illustrates an example computer-readable storage medium having instructions configured to implement all (or portion of) software implementations of key encoder 180 of FIG. 1, key decoder 120 of FIG. 1, encoder 980 of FIG. 9, decoder 906 of FIG. 9, and/or practice (aspects of) processes 200 of FIG. 2, 300 of FIG. 3, 400 of FIG. 4, 500 of FIG. 5, 600 of FIG. 6, 700 of FIG. 7 and 800 of FIG. 8, earlier described, in accordance with various embodiments. As illustrated, computer-readable storage medium 1002 may include the executable code of a number of programming instructions or bit streams 1004. Executable code of programming instructions (or bit streams) 1004 may be configured to enable a device, e.g., computer device 900, in response to execution of the executable code/programming instructions (or operation of an encoded hardware accelerator 907), to perform (aspects of) processes performed by key encoder 180 of FIG. 1, key decoder 120 of FIG. 1, decoder 906 of FIG. 9, encoder 980 of FIG. 9, and/or practice (aspects of) processes 200 of FIG. 2, 300 of FIG. 3, 400 of FIG. 4, 500 of FIG. 5, 600 of FIG. 6, 700 of FIG. 7 and 800 of FIG. 8. In alternate embodiments, executable code/programming instructions/bit streams 1004 may be disposed on multiple non-transitory computer-readable storage medium 1002 instead. In embodiments, computer-readable storage medium 1002 may be non-transitory. In still other embodiments, executable code/programming instructions 1004 may be encoded in transitory computer readable medium, such as signals.

Referring back to FIG. 9, for one embodiment, at least one of processors 902 may be packaged together with a computer-readable storage medium having some or all of computing logic 922 (in lieu of storing in system memory 904 and/or mass storage device 917) configured to practice all or selected ones of the operations earlier described with reference to FIGS. 2-8. For one embodiment, at least one of processors 902 may be packaged together with a computer-readable storage medium having some or all of computing logic 922 to form a System in Package (SiP). For one embodiment, at least one of processors 902 may be integrated on the same die with a computer-readable storage medium having some or all of computing logic 922. For one embodiment, at least one of processors 902 may be packaged together with a computer-readable storage medium having some or all of computing logic 922 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

EXAMPLES

Example 1 is an apparatus for microcontroller (μC) or system-on-chip (SoC) computing, comprising: a set of fuses disposed in a μC or a SoC to store a seed value and M pairs of loop counter values (LCVs) with which to locally generate M private keys from the seed value on the microcontroller or SoC, where M is a positive integer, each private key to decrypt data encrypted with a pre-defined public key cryptosystem, wherein each private key includes two prime numbers p and q (p,q), the LCVs being a number of iterations of a key derivation function (KDF) needed to respectively obtain p and q from the seed value; and a key decoder, disposed in the (μC) or the SoC, and coupled to the set of fuses, to read the seed value and the M pairs of LCVs, and, for each of the M private keys to: respectively generate (p,q) from the seed value by respectively iterating the KDF by the LCVs for that key.

Example 2 is the apparatus of example 1, wherein each fuse has two states, and holds one bit.

Example 3 is the apparatus of example 1, wherein the size of each of the M private keys is the same.

Example 4 is the apparatus of example 3, wherein a bitsize of the seed value is a function of the bitsize of the private keys.

Example 5 is the apparatus of example 1, wherein each LCV is 16 bits long.

Example 6 is the apparatus of example 1, wherein the pre-defined public key cryptosystem is Rivest-Shamir-Adelman (RSA).

Example 7 is the apparatus of example 6, wherein each private key is stored in one of 2048, 3072 or 4096 bits, and the seed value is stored in at least $\frac{1}{8}^{th}$ of the number of bits of the private key.

Example 8 is the apparatus of example 1, wherein the KDF is one of keyed hashed message authentication code (HMAC) or a pseudo random number generator.

Example 9 is the apparatus of example 1, wherein the key decoder is further to first derive a unique sub-seed for each private key from the seed, and then obtain p and q for each private key from the sub-seed.

Example 10 is the apparatus of example 9, wherein the key decoder is further to derive the sub-seed by applying the KDF to the seed and a salt value.

Example 11 is the apparatus of example 9, wherein the key decoder is further to: first derive a sub-seed_p and a sub-seed_q for each of p and q, respectively, from the sub-seed, by applying the KDF to the sub-seed; and obtain the LCVs by iteratively applying the KDF to each of sub-seed_p and a sub-seed_q, respectively.

Example 12 is the apparatus of example 1, wherein the respective LCV for each p or q of each private key is the number of iterative loops of the KDF required to obtain values of (p, q) that are both prime numbers and that both satisfy validity requirements for private keys of the pre-defined public key cryptosystem.

Example 13 is one or more non-transitory computer-readable storage media comprising a set of instructions, which, when executed on a processor coupled to a micro-controller (μC) or system-on-chip (SoC) cause the processor to compress multiple cryptographic private keys, including to: generate, randomly, a seed value from which to generate M private keys, where M is a positive integer, each private key to decrypt data encrypted with a pre-defined public key cryptosystem, wherein each private key includes two prime numbers p and q; for each private key, respectively generate a pair of loop counter values (LCVs), the LCVs being a number of iterations of a key derivation function (KDF) needed to respectively obtain p and q from the seed value; and store the seed value and the LCVs pairs in a nonvolatile memory of the μC or SoC.

Example 14 is the one or more non-transitory computer-readable storage media of example 13, wherein the size of each of the private keys is the same.

Example 15 is the one or more non-transitory computer-readable storage media of example 13, wherein a size of the seed value is a function of the size of the private keys.

Example 16 is the one or more non-transitory computer-readable storage media of example 13, wherein the pre-defined public key cryptosystem is Rivest-Shamir-Adelman (RSA).

Example 17 is the one or more non-transitory computer-readable storage media of example 13, wherein the KDF is one of keyed hashed message authentication code (HMAC) or a pseudo random number generator.

Example 18 is the one or more non-transitory computer-readable storage media of example 13, further comprising instructions that, when executed, cause the processor to: first derive a unique sub-seed value for each private key from the seed value, by applying the KDF to the seed value and a salt value, and then obtain p and q for each private key from the sub-seed.

Example 19 is the one or more non-transitory computer-readable storage media of example 18, further comprising instructions that, when executed, cause the processor to: first derive a sub-seed_p and a sub-seed_q for each of p and q, respectively, from the sub-seed, by applying the KDF to the sub-seed, and then obtain p and q for each private key from sub-seed_p and a sub-seed_q, respectively.

Example 20 is the one or more non-transitory computer-readable storage media of example 16, wherein the respective LCV for each p or q of each private key is the number of iterative loops of the KDF required to obtain values of a p and q pair (p, q) that are both prime numbers and that both satisfy validity requirements for RSA private keys.

Example 21 is a method of microcontroller (μC) or system-on-chip (SoC) computing, comprising: obtaining, locally, from a nonvolatile memory of a microcontroller (μC) or system-on-chip (SoC), a randomly generated seed value from which to derive M private Elliptic-Curve Cryptography (ECC) keys; generating, locally, within the μC or the SoC, a salt value (salt1 through saltM) for each of the M private ECC keys, where M is an integer; and respectively applying, locally, within the μC or the SoC, a key derivation function (KDF) to the seed and each of salt1 through saltM, to obtain the M ECC private keys.

Example 22 is the method of example 21, wherein the nonvolatile memory is a set of fuses, and wherein each fuse has two states, and holds one bit.

Example 23 is the method of example 21, wherein the randomly generated seed value was either randomly generated by an ECC, or a Rivest-Shamir-Adelman (RSA), private key generation device and stored in the nonvolatile memory.

Example 24 is the apparatus of example 21, wherein the KDF is one of as keyed hashed message authentication code (HMAC) or a pseudo random number generator.

Example 25 is the method of example 21, wherein the seed and each of the ECC private keys include the same number of K bits, where K is an integer, and the nonvolatile memory is a set of K fuses.

Example 26 is an apparatus for computing, comprising: nonvolatile storage means to store a seed value and M pairs of loop counter values (LCVs) with which to locally generate M private keys from the seed value on the microcontroller or SoC, where M is a positive integer, each private key to decrypt data encrypted with a pre-defined public key cryptosystem, wherein each private key includes two prime numbers p and q (p,q), the LCVs being a number of iterations of a key derivation function (KDF) needed to respectively obtain p and q from the seed value; and means for key decoding coupled to the nonvolatile storage means, including means for reading the seed value and the M pairs of LCVs, and further including means for key generating to, for each of the M private keys: respectively generate (p,q) from the seed value by respectively iterating the KDF by the LCVs for that key.

Example 27 is the apparatus for computing of example 26, wherein each LCV is 16 bits long.

Example 28 is the apparatus for computing of example 26, wherein the pre-defined public key cryptosystem is Rivest-Shamir-Adelman (RSA).

Example 29 is the apparatus for computing of example 28, wherein each private key is stored in one of 2048, 3072 or 4096 bits, and the seed value is stored in at least $1/8^{th}$ of the number of bits of the private key.

Example 30 is the apparatus of example 26, wherein the KDF is one of keyed hashed message authentication code (HMAC) or a pseudo random number generator.

Example 31 is an apparatus for computing, comprising: means for randomly generating a seed value from which to generate M private keys, where M is a positive integer, each private key to decrypt data encrypted with a pre-defined public key cryptosystem, wherein each private key includes two prime numbers p and q; means for generating, for each private key, respectively, a pair of loop counter values (LCVs), the LCVs being a number of iterations of a key derivation function (KDF) needed to respectively obtain p and q from the seed value; and means for storing the seed value and the LCVs pairs in a nonvolatile memory of a coupled microcontroller (μC) or system-on-chip (SoC).

Example 32 is the apparatus for computing of example 31, wherein the KDF is one of keyed hashed message authentication code (HMAC) or a pseudo random number generator.

Example 33 is the apparatus for computing of example 13, wherein the generating means includes means for deriving a unique sub-seed value for each private key from the seed value, by applying the KDF to the seed value and a salt value, and then obtaining p and q for each private key from the sub-seed.

Example 34 is the apparatus for computing of example 33, wherein the means for deriving first derives a sub-seed_p and a sub-seed_q for each of p and q, respectively, from the sub-seed, by applying the KDF to the sub-seed, and then obtains p and q for each private key from sub-seed_p and a sub-seed_q, respectively.

Example 35 is the apparatus for computing of example 36, wherein the respective LCV for each p or q of each private key generated by the means for generating is the number of iterative loops of the KDF required to obtain values of a p and q pair (p, q) that are both prime numbers and that both satisfy validity requirements for RSA private keys.

Example 36 is an apparatus for computing, comprising: means for obtaining, locally, from a nonvolatile memory of a microcontroller (μC) or system-on-chip (SoC), a randomly generated seed value from which to derive M private Elliptic-Curve Cryptography (ECC) keys; means for generating, locally, within the μC or the SoC, a salt value (salt1 through saltM) for each of the M private ECC keys, where M is an integer; and means for respectively applying, locally, within the μC or the SoC, a key derivation function (KDF) to the seed and each of salt1 through saltM, to obtain the M ECC private keys.

Example 37 is the apparatus for computing of example 36, wherein the nonvolatile memory is a set of fuses, and wherein each fuse has two states, and holds one bit.

Example 38 is the apparatus for computing of example 36, wherein the means for obtaining includes a means for randomly generating a seed value, and either randomly generates the seed value, or obtains it from a Rivest-Shamir-Adelman (RSA), private key generation device and stored in the nonvolatile memory of the μC or SoC.

What is claimed is:

1. An apparatus for microcontroller (μC) or system-on-chip (SoC) computing, comprising:
    a set of fuses disposed in a μC or a SoC to store a seed value and M pairs of loop counter values (LCVs), with which to locally generate M private keys from M sub-seed values on the microcontroller or SoC, where M is a positive integer, each private key to decrypt data encrypted with a pre-defined public key cryptosystem, wherein each private key includes two prime numbers p and q (p, q), the M sub-seed values being generated by applying M salt values to the seed value, the M pairs of LCVs being M pairs of iterations of M copies of a key derivation function (KDF) needed to respectively obtain the M pairs of p and q from the M sub-seed values; and
    a key decoder, disposed in the (μC) or the SoC coupled to the set of fuses, and including M keyed hashed message authentication code (HMAC) function as the M KDF, to read the seed value and the LCVs, and to generate the M sub-seed values and thereafter, the M private keys in parallel, wherein, for each of the M private keys, the key decoder is to:
        respectively generate a pair of (p, q) from the corresponding sub-seed value by respectively iterating the HMAC function by the corresponding pair of LCVs for that particular private key.

2. The apparatus of claim 1, wherein each fuse has two states, and holds one bit.

3. The apparatus of claim 1, wherein the size of each of the M private keys is the same.

4. The apparatus of claim 3, wherein a bitsize of the seed value is a function of the bitsize of the private keys.

5. The apparatus of claim 1, wherein each LCV is 16 bits long.

6. The apparatus of claim 1, wherein the pre-defined public key cryptosystem is Rivest-Shamir-Adelman (RSA).

7. The apparatus of claim 6, wherein each private key is stored in one of 2048, 3072 or 4096 bits, and the seed value is stored in at least $1/8^{th}$ of the number of bits of the private key.

8. The apparatus of claim 1, wherein for each of the M private keys, the key decoder is further to:
    First derive a sub-seed_p and a sub-seed_q for each of p and q, respectively, from the sub-seed of the particular private key, by applying the HMAC function to the sub-seed of the particular private key.

9. The apparatus of claim 1, wherein the respective LCV for each p or q of each private key is the number of iterative loops of the KDF required to obtain values of (p, q) that are both prime numbers and that both satisfy validity requirements for private keys of the pre-defined public key cryptosystem.

10. One or more non-transitory computer-readable storage media comprising a set of instructions, which, when executed on a processor coupled to a microcontroller (μC) or system-on-chip (SoC), cause the processor to compress multiple cryptographic private keys, including to:
    generate, randomly, a seed value from which to generate M sub-seed values by applying M salt values to the seed value, and thereafter, to generate M private keys using the M sub-seed values, where M is a positive integer, each private key to decrypt data encrypted with a pre-defined public key cryptosystem, wherein each private key includes two prime numbers p and q;
    for each private key, respectively generate a pair of loop counter values (LCVs), the LCVs being a number of iterations of a keyed hashed message authentication code (HMAC) function needed to respectively obtain p and q from the sub-seed value of the particular private key; and store the seed value and the LCVs pairs in a set of fuses of the μC or SoC.

11. The one or more non-transitory computer-readable storage media of claim 10, wherein the size of each of the private keys is the same.

12. The one or more non-transitory computer-readable storage media of claim 10, wherein a size of the seed value is a function of the size of the private keys.

13. The one or more non-transitory computer-readable storage media of claim 10, wherein the pre-defined public key cryptosystem is Rivest-Shamir-Adelman (RSA).

14. The one or more non-transitory computer-readable storage media of claim 10, further comprising instructions that, when executed, cause the processor to perform for each private key:

first derive a sub-seed_p and a sub-seed_q for each of p and q, respectively, from the sub-seed of the particular private key, by applying the HMAC function to the sub-seed of the particular private key, and then obtain p and q for the particular private key from the sub-seed_p and the sub-seed_q of the particular private key.

15. The one or more non-transitory computer-readable storage media of claim 13, wherein the respective LCV for each p or q of each private key is the number of iterative loops of the HMAC function required to obtain values of a p and q pair (p, q) that are both prime numbers and that both satisfy validity requirements for RSA private keys.

16. A method of microcontroller (μC) or system-on-chip (SoC) computing, comprising:

obtaining, locally, from a set of fuses of a microcontroller (μC) or system-on-chip (SoC), a randomly generated seed value from which to derive M private Elliptic-Curve Cryptography (ECC) keys;

generating, locally, within the μC or the SoC, a salt value (salt1 through saltM) for each of the M private ECC keys, where M is an integer; and respectively applying, locally, within the μC or the SoC, a keyed hashed message authentication code (HMAC) function to the seed and each of salt1 through saltM, in parallel, to obtain M sub-seeds, and thereafter to obtain, in parallel, the M ECC private keys using the M sub-seeds.

17. The method of claim 16, wherein each fuse has two states, and holds one bit.

18. The method of claim 16, wherein the randomly generated seed value was randomly generated by a private key generation device and stored in the set of fuses.

19. The method of claim 16, wherein the seed and each of the ECC private keys include the same number of K bits, where K is an integer.

* * * * *

UNITED STATES PATENT AND TRADEMARK OFFICE
CERTIFICATE OF CORRECTION

PATENT NO.        : 10,862,680 B2                                    Page 1 of 1
APPLICATION NO.   : 16/142587
DATED             : December 8, 2020
INVENTOR(S)       : Daniel Nemiroff et al.

It is certified that error appears in the above-identified patent and that said Letters Patent is hereby corrected as shown below:

In the Claims

Column 20
Line 43, "First…" should read "first…"

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*